US010129758B2

(12) United States Patent
Cordeiro et al.

(10) Patent No.: US 10,129,758 B2
(45) Date of Patent: Nov. 13, 2018

(54) REGULATING OPERATION OF 60 GHZ DEVICES

(71) Applicant: Intel IP Corporation, Santa Clara, CA (US)

(72) Inventors: Carlos Cordeiro, Portland, OR (US); Reza Arefi, Great Falls, VA (US); Ali S. Sadri, San Diego, CA (US)

(73) Assignee: Intel IP Corporation, Santa Clara, CA (US)

( * ) Notice: Subject to any disclaimer, the term of this patent is extended or adjusted under 35 U.S.C. 154(b) by 61 days.

(21) Appl. No.: 15/373,404

(22) Filed: Dec. 8, 2016

(65) Prior Publication Data
US 2018/0167822 A1 Jun. 14, 2018

(51) Int. Cl.
| | |
|---|---|
| *H04W 16/14* | (2009.01) |
| *H04W 12/06* | (2009.01) |
| *H04W 64/00* | (2009.01) |
| *H04W 8/14* | (2009.01) |
| *H04W 40/24* | (2009.01) |
| *H04W 84/12* | (2009.01) |

(52) U.S. Cl.
CPC .............. *H04W 16/14* (2013.01); *H04W 8/14* (2013.01); *H04W 12/06* (2013.01); *H04W 40/244* (2013.01); *H04W 64/006* (2013.01); *H04W 84/12* (2013.01)

(58) Field of Classification Search
CPC ....... H04W 16/14; H04W 12/16; H04W 8/14; H04W 40/244; H04W 40/64006; H04W 84/12
See application file for complete search history.

(56) References Cited

U.S. PATENT DOCUMENTS

| | | | | |
|---|---|---|---|---|
| 6,832,093 | B1 * | 12/2004 | Ranta ..................... | H04W 48/04 455/422.1 |
| 7,983,686 | B2 * | 7/2011 | Bhesania ............ | H04L 41/0809 455/403 |
| 9,723,473 | B2 * | 8/2017 | Shimizu ................ | H04W 4/027 |

(Continued)

OTHER PUBLICATIONS

"Spectrum Frontiers R&O and FNPRM", Federal Communications Commission Use of Spectrum Bands Above 24 GHz for Mobile Radio Services, et al, Online https://www.fcc.gov/document/spectrum-frontiers-ro-and-fnprm, (accessed on May 2, 2018), 2 pgs.

*Primary Examiner* — Marcos Torres
(74) *Attorney, Agent, or Firm* — Schwegman Lundberg & Woessner, P.A.

(57) ABSTRACT

Embodiments of a wireless station and method for controlling use of the 60 GHz band are described. The station (STA) can include memory and processing circuitry. The processing circuitry is configured to decode a packet received from a second STA via a microwave wireless channel. The packet includes information indicating that a millimeter wave wireless channel is unavailable for communication. A current geographic location and a mobility status for the second STA may be determined based on an authentication message originating from a third STA. The mobility status may indicate whether the second STA is moving or is stationary. The second STA may be authenticated based at least on the mobility status. Upon authenticating the second STA, usage of the millimeter wave wireless channel may be suspended for a pre-determined period of time.

17 Claims, 6 Drawing Sheets

(56) References Cited

U.S. PATENT DOCUMENTS

2016/0066344 A1* 3/2016 Kanno ................. H04W 48/02
    370/338
2018/0034912 A1* 2/2018 Binder .................... H04L 67/12

* cited by examiner

REGULATING OPERATION OF 60 GHZ DEVICES

TECHNICAL FIELD

Embodiments pertain to wireless networks. Some embodiments relate to wireless local area networks (WLANs), Wi-Fi networks and networks operating in accordance with one of the IEEE 802.11 standards. Some embodiments relate to millimeter wave (mmWave) communications, including mmWave communications in accordance with IEEE 802.11ad and/or IEEE 802.11ay on the 60 GHz band. Some embodiments relate to regulating operation of 60 GHz devices, such as allowing or restricting operation of 60 GHz devices on board aircraft.

BACKGROUND

Wi-Fi communications have been evolving toward ever increasing data rates (e.g., from IEEE 802.11a/g to IEEE 802.11n to IEEE 802.11ac to IEEE 802.11ax). A Wi-Fi communication technology, known as Wireless Gigabit (Wi-Gig) and based on IEEE 802.11ad, has been developed to make use of millimeter wave (mmWave) communications (e.g., using the 60 GHz band) for unlicensed operation at higher data rates. These systems are also referred to as Multi-Gigabit Wireless Systems (MGWS) in some regulatory circles, such as ITU-R. Recent years have witnessed an increase in the uptake of WiGig technology in many user devices, such as laptops and notebooks, for a variety of applications such as wireless docking, wireless USB, wireless networking, broadband access and backhaul, providing connection speeds of multi-gigabits per second.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
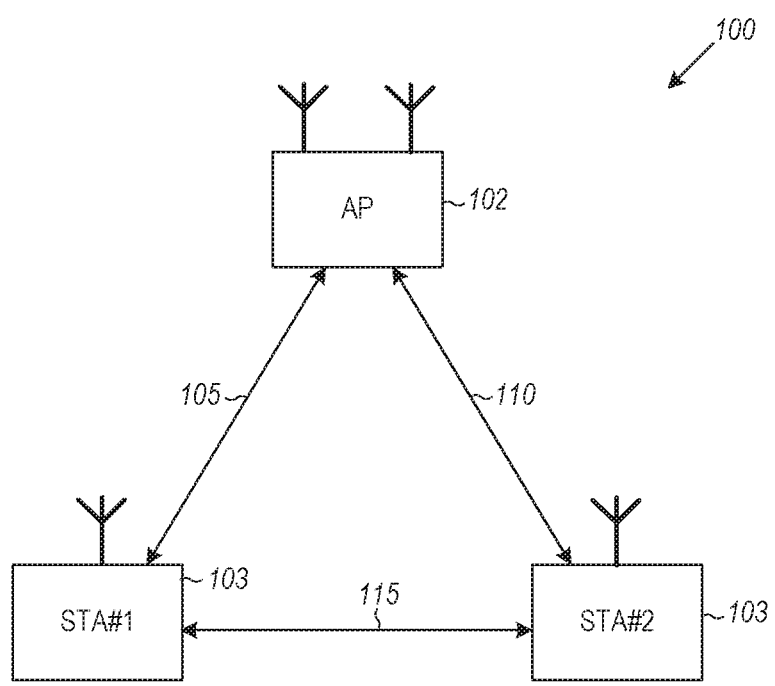
FIG. 1 illustrates a wireless network in accordance with some embodiments.

FIG. 1 illustrates a wireless network in accordance with some embodiments. In some embodiments, the network 100 may be a Wireless Local Area Network (WLAN) or a Wi-Fi network, although the scope of embodiments is not limited in this respect. It should be noted that embodiments are not limited to the number or type of components shown in the example network 100. Embodiments are also not limited by the example network 100 in terms of the arrangement of the components or the connectivity between components as shown. In addition, some embodiments may include additional components.

The example network 100 may include one or more access points (APs) 102 and one or more stations (STAs) 103. In some embodiments, the AP 102 may be arranged to operate in accordance with one or more IEEE 802.11 standards, such as IEEE 802.11 a/b/g/n/ac/ad/af/ah/aj as well as 802.11ax. These embodiments are not limiting, however, as other base station components, which may or may not be arranged to operate in accordance with a standard, may be used in some embodiments. As an example, an Evolved Node-B (eNB) arranged to operate in accordance with one or more Third Generation Partnership Project (3GPP) standards, including but not limited to 3GPP Long Term Evolution (LTE) standards, may be used in some cases. In some embodiments, the STAs 103 may be arranged to operate in accordance with one or more IEEE 802.11 standards. These embodiments are not limiting, however, as other mobile devices, portable devices and/or other devices, which may or may not be arranged to operate in accordance with a standard, may be used in some embodiments. As an example, a User Equipment (UE) arranged to operate in accordance with one or more Third Generation Partnership Project (3GPP) standards, including but not limited to 3GPP LTE standards, may be used in some cases.

In some embodiments, the STAs 103 may be configured to communicate with the AP 102 and/or with other STAs 103. As shown in the example network 100 in FIG. 1, STA #1 may communicate with the AP 102 over the wireless link 105 and STA may communicate with the AP 102 over the wireless link 110. In some embodiments, direct communication between STAs 103 may be possible, such as over the wireless link 115 between STA #1 and STA #2. These embodiments are not limiting, however, as the direction communication between STAs 103 may not necessarily be possible in some embodiments.

In some embodiments, the communication between the AP 102 and the STAs 103 and/or the communication between the STAs 103 may be performed in accordance with one or more standards, such as an 802.11 standard (including IEEE 802.11 a/b/g/n/ac/ad/af/ah/aj as well as 802.11ax), a 3GPP standard (including 3GPP LTE standards) and/or other standards. These embodiments are not limiting, however, as other communication techniques and/or protocols, which may or may be included in a standard, may be used for the communication between the AP 102 and the STAs 103 and/or the communication between the STAs 103, in some embodiments.

In accordance with some embodiments, one of the STAs 103 may transmit an authorization message in one or more frames to the AP 102, which may then be relayed to the other STA 103 by the AP 102. In some examples, the authorization message may be used for regulating/controlling access to a 60 GHz band, as described in more detail below.

It should be noted that the STAs 103, the AP 102, mobile devices, base stations and/or other devices may be configured to operate in various frequency bands, including but not limited to millimeter wave (mmWave), ultra-high frequency (UHF), microwave and/or other frequency bands. An example of the mmWave frequency band is the 60 GHz band, which covers the spectrum of 57-71 GHz, which parts thereof have been assigned to unlicensed use in the United States, Europe and Asia. WiGig technology has been developed to make use of the 60 GHz band for unlicensed operation based on the IEEE 802.11ad standard.

The 60 GHz band has a unique propagation characteristic due to extremely high atmospheric absorption of the radio waves by oxygen molecules. This characteristic results in the 60 GHz radio waves not traveling too far before being weakened to the level of ambient noise. As a result, coverage area of 60 GHz radios is much smaller compared to adjacent bands, allowing the frequency to be reused much closer without creating interference to other 60 GHz devices, as well as the possibility of avoiding harmful interference to other incumbents of the band and those in adjacent bands. This unique characteristic of the 60 GHz band has been a factor for the regulatory decisions made to allow unlicensed operation in this band without harmful interference to other incumbents of this band and other bands that could be potentially affected.

The 60 GHz band may include the following IEEE 802.11ad or IEEE 802.11ay channels—channel 1 centered at 58.32 GHz; channel 2 centered at 60.48 GHz; channel 3 centered at 62.64 GHz; channel 4 centered at 64.80 GHz; channel 5 centered at 66.96 GHz; and channel 6 centered at 69.12 GHz.

One coexistence issue considered by the Federal Communications Commission (FCC) was related to Radio Astronomy Service (RAS) with stations potentially receiving signals on harmonics of the transmissions in the 60 GHz band. Even though these harmonics are quite weak, due to extremely high sensitivity of RAS receivers, it was concluded by the FCC that operation of 60 GHz radios on board aircrafts flying over RAS sites might cause harmful interference to RAS. Similar coexistence concerns are expressed for the case of potential harmful interference to Earth Exploration Satellites Services (EESS) operating in the lower parts of the 60 GHz band. Therefore, use of 60 GHz on board airplanes is currently prohibited by the FCC. Accordingly, techniques and/or operations that address controlling the use of the mmWave frequency bands (e.g., the 60 GHz band) are disclosed herein.

In some embodiments, the STAs 103, AP 102, other mobile devices, other base stations and/or other devices may be configured to perform operations related to contention based communication. As an example, the communication between the STAs 103 and/or AP 102 and/or the communication between the STAs 103 may be performed in accordance with contention based techniques. In such cases, the STAs 103 and/or AP 102 may be arranged to contend for a wireless medium (e.g., during a contention period) to receive exclusive control of the medium for a transmission period. For instance, the transmission period may include a transmission opportunity (TXOP), which may be included in an 802.11 standard and/or other standard.

It should be noted that embodiments are not limited to usage of contention based techniques, however, as some communication (such as that between mobile devices and/or communication between a mobile device and a base station) may be performed in accordance with schedule based techniques. Some embodiments may include a combination of contention based techniques and schedule based techniques.

In some embodiments, the communication between mobile devices and/or between a mobile device and a base station may be performed in accordance with any suitable multiple-access techniques and/or multiplexing techniques. Accordingly, one or more of orthogonal frequency division multiple access (OFDMA), orthogonal frequency division multiplexing (OFDM), code-division multiple access (CDMA), time-division multiple access (TDMA), frequency division multiplexing (FDMA), space-division multiple access (SDMA), multiple-input multiple-output (MIMO), multi-user (MU) multiple-input multiple-output (MIMO) (MU-MIMO) and/or other techniques may be employed in some embodiments.

In some embodiments, channels used for communication between STAs 103 and/or APs 102 may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel may be configured for transmitting a number of spatial streams, in some embodiments. These embodiments are not limiting, however, as other suitable bandwidths may be used in some embodiments.

In some embodiments, high-efficiency wireless (HEW) techniques may be used, although the scope of embodiments is not limited in this respect. As an example, techniques included in 802.11ax standards and/or other standards may be used. In such embodiments, an HEW packet may be generated in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. It should be noted that the terms "HEW" and "HE" may be used interchangeably and both terms may refer to high-efficiency Wireless Local Area Network operation and/or high-efficiency operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
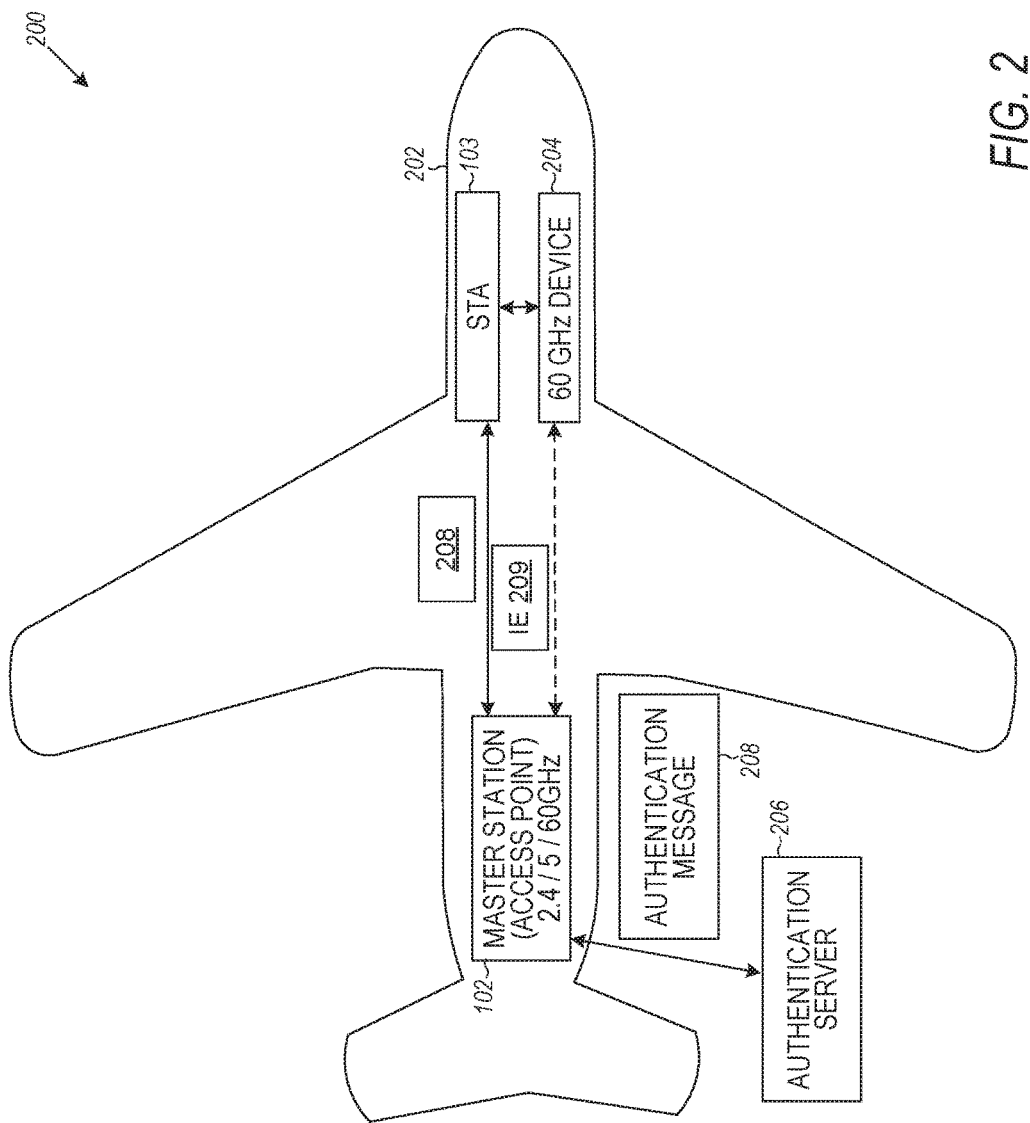
FIG. 2 illustrates an example usage scenario of an access point (AP) and a wireless device (STA) regulating usage of the 60 GHz band, in accordance with an example embodiment.

FIG. 2 illustrates an example usage scenario of an access point (AP) and a wireless device (STA) regulating usage of the 60 GHz band, in accordance with an example embodiment. Referring to FIG. 2, the usage scenario 200 is based on using microwave communications 2.4 GHz and 5 GHz Wi-Fi communications) on board airplanes other moving vehicles, such as trains, buses, etc.). The airplane 202 may be equipped with a master station (or access point) 102, which may be configured to operate in one or more microwave wireless band (e.g., 2.4 GHz and/or 5 GHz) as well as a millimeter wave wireless band (e.g., 60 GHz band). The access point 102 may be in communication with a wireless station (STA) 103, which may also be configured to use the microwave and millimeter wave wireless bands. In this regard, the STA 103 may be communicatively coupled to a 60 GHz device 204 (a laptop, a display, a smart phone, etc)

Figure 4:
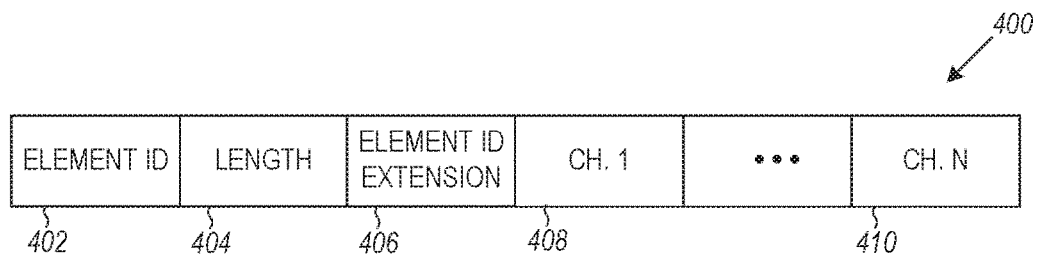
FIG. 4 illustrates an example information element, which may be used for regulating usage of one or more 60 GHz channels, in accordance with an example embodiment.

In an example, a microwave wireless channel (e.g., a 2.4 or 5 GHz Wi-Fi channel) may be used to signal whether a specific 60 GHz channel may or may not be used. For example, an information element (IE) 209 may be communicated by the AP 102, with the IE 209 indicating whether the AP 102 is located on board aircraft (or on board another moving vehicle). The 209 may further indicate one or more 60 GHz channels that are allowed for use (or restricted from use). An example IE is illustrated in FIG. 4.

In an example, the AP 102 may be configured to transmit the IE 209 in a beacon frame or a probe response frame. In a static AP configuration scenario, the IE 209 may be transmitted regardless of the geographic location of the aircraft 202, i.e., regardless of the aircraft's vicinity to an RAS site, an EESS site or any other territory associated with restrictions for using the 60 GHz band. In a dynamic AP configuration scenario, the AP 102 may transmit the IE 209 when the aircraft is in the vicinity to an RAS site, an FESS site or any other territory associated with restrictions for using the 60 GHz band.

In an example operation, the AP 102 may transmit the IE 209 periodically, e.g., every 100 ms in a beacon frame transmission. The IE 209 may indicate that one or more 60 GHz channels may not be used for a pre-determined period of time. The pre-determined period of time may be the time until the next IE 209 transmission (e.g., the next beacon frame transmission). Alternatively, the IE 209 may indicate the pre-determined period of time during which the indicated 60 GHz channel (or channels) may not be used. As another example, the IE 209 may indicate the 60 GHz channel (or channels) that may be used during the pre-determined time period.

After the STA 103 received the IE 209, an AP authentication may take place so that the STA 103 authenticates the AP 102 (e.g., verifies that the AP 102 is configured within the airplane 202 and/or the AP 102 is in the vicinity of an RAS site, an EESS site or any other territory associated with restrictions for using the 60 GHz band). During authentication, an authentication message 208 may be communicated from an authentication server 206 to the STA 103, via the AP 102. For example, the STA 103 may be used to connect with the AP 102 for purposes of obtaining Internet access provided by the AP 102. The AP 102 may in turn obtain Internet access via the server 206. After the STA 103 establishes connection with an Internet service provider (e.g., the server 206 via the AP 102), data traffic from the server 206 may be forwarded to the STA 103 by the AP 102. In this regard, upon receiving the IE 209 associated with restricting (or allowing) use of one or more 60 GHz channels, the STA 103 may authenticate the AP 102 via the authentication message 208.

Figure 7:
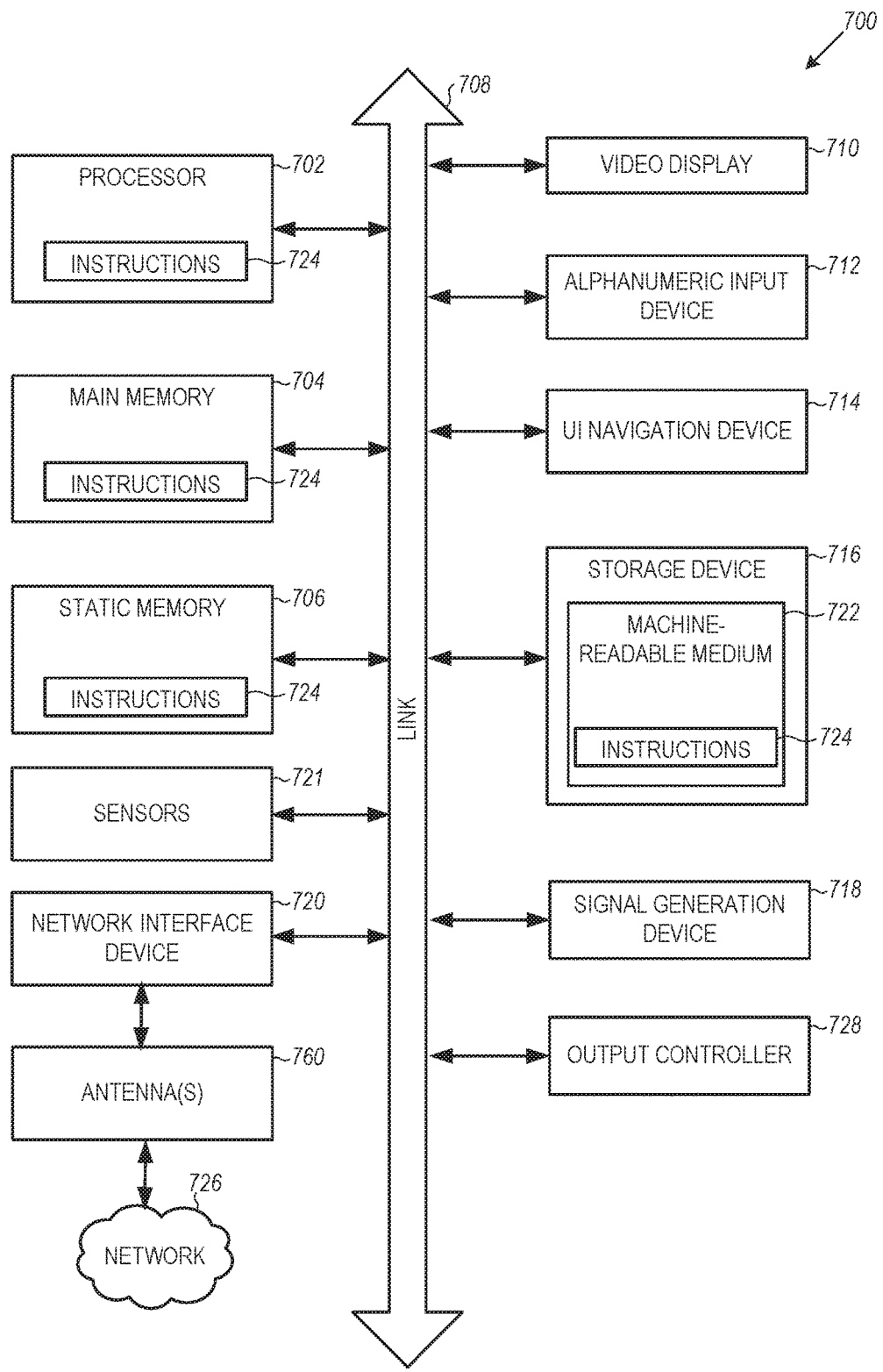
FIG. 7 illustrates a block diagram of an example machine upon which any one or more of the techniques (e.g., methodologies) discussed herein may perform.

In an example, the authentication message 208 may provide a confirmation that the AP 102 is configured within a moving airplane 202, the AP 102 is in the vicinity of an RAS site, an FESS site or any other territory associated with restrictions for using the 60 GHz band. Additionally, the authentication message 208 may also provide a pre-determined time duration during which the one or more 60 GHz channels indicated by the IE 209 are available (or not available) for use by the STA 103. In an example, the authentication message 208 may be sent directly from the server 206 to the STA 103. The server 206 may be a computing device (e.g., as illustrated in FIG. 7) which may use wired and/or wireless connection to the AP 102 and/or the STA 103.

After the STA 103 authenticates the AP 102 using the authentication message 208, the STA 103 may stop using the one or more 60 GHz channels indicated in the IE 209 for the duration of the pre-determined time period (e.g., until a next beacon frame transmission with a new IE 209 is received with the new IE indicating no restriction on usage of a 60 GHz channel).

Figure 3:
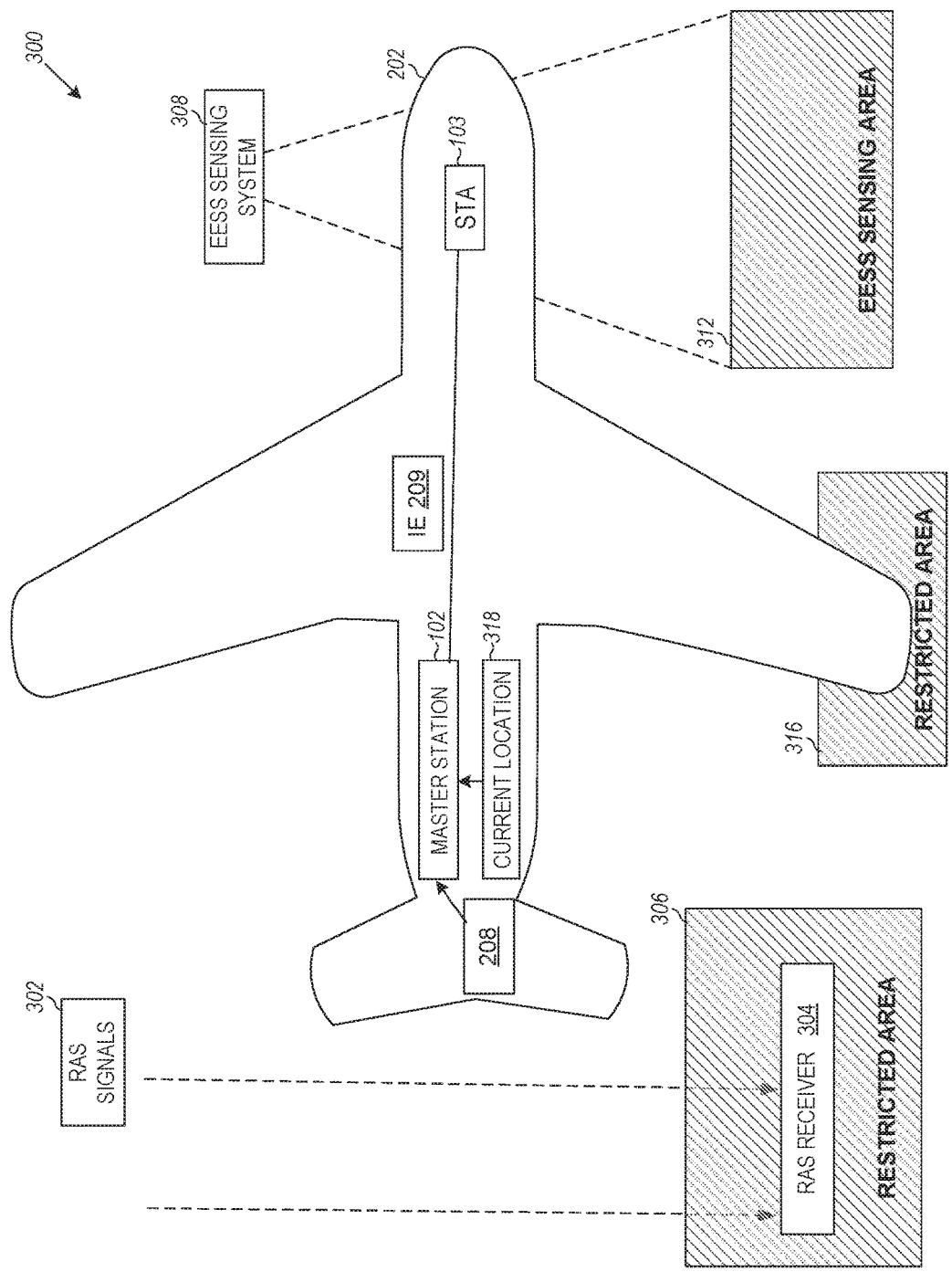
FIG. 3 illustrates another example usage scenario of the AP and STA regulating usage of the 60 GHz band, in accordance with an example embodiment.

FIG. 3 illustrates another example usage scenario of the AP and STA regulating usage of the 60 GHz band, in accordance with an example embodiment. Referring to FIG. 3, the example scenario 300 is associated with instances when usage of one or more 60 GHz channels is controlled based on the location of the AP 102. More specifically, the AP 102 may be located within aircraft 202, which may be in proximity to one or more signal-sensitive areas, such as restricted areas 306 and 316, and sensing area 312. As used herein, the terms "restricted area" or "sensing area" indicate an area e.g., area within a certain radius from a specific location, territory, country, and so forth) with active rules or regulations restricting or allowing use of certain wireless channels (e.g., channels associated with the 60 GHz band).

In an example, the aircraft 202 may be in the vicinity of an RAS receiver 304 receiving RAS signals 302 from deep space, or an EESS sensing system 308 collecting information from EESS sensing area 312. Areas 306 and 312. (e.g., area 306 is within a certain radius from the receiver 304) may be restricted areas for purposes of wireless communications (e.g., 60 GHz band communications). Additional restricted area 316 is also illustrated in FIG. 3, which may be an area that is not associated with an RAS receiver or EESS sensing station but still may have restrictions on wireless communications (e.g., 60 GHz band communications).

In operation, the AP 102 may receive a current location information 318, which may indicate the current location of the AP 102 (or the aircraft 202) as well as the locations of one or more signal-sensitive areas, such as 306, 312, and 316. Alternatively, the current location information 318 may be communicated as part of the authentication message 208, received by the AP 102 from the authentication server 206 (FIG. 2). The AP 102 may determine whether the current location of the aircraft 202 is within a certain pre-determined threshold distance from any of the signal-sensitive areas (306, 312, and 316) or from the sensing system 308, and may communicate the IE 209 to the STA 103 to control use of one or more 60 GHz channels if the current aircraft location is within the pre-determined threshold distance.

In an example, the current location information 318 may be communicated to the STA 103, and the STA 103 may determine whether the AP 102 or the aircraft 202 is within the pre-determined threshold distance from any of the signal-sensitive areas (306, 312, and 316) or from the sensing system 308. If the AP 102 or the aircraft 202 is within the pre-determined threshold distance, the STA 103 may suspend using one or more 60 GHz channels (or another type of wireless channels) as indicated by the received IE 209. In an example, the current location 318 received by the STA 103 may include the location of the signal-sensitive areas (306, 312, and 316), location of the sensing system 308 (which may be a drone or a satellite), location of one or more sources of the RAS signals 302, as well as the pre-determined threshold distance. However, the STA 103 may be configured to determine the location of the STA 102 (or the aircraft 202) using a GPS module within the STA 103.

In an example, the aircraft 202 may be stationary and the STA 102 may trigger communication of the IE 209 when the aircraft 202 is in the vicinity of (i.e., within a pre-determined threshold distance away from) the restricted areas (306, 312, or 316) or from the satellites 302 and 308.

In an example, the restricted area 316 may be a certain country with usage restrictions associated with one or more wireless channels. In this case, AP 102 may continuously communicate the IE 209 indicating restriction on one or more wireless channels (e.g., 60 GHz channels) as long as the aircraft is flying over (or is located within) the area 316. In this regard, when the STA 103 authenticates the AP 102, the STA 103 may verify (e.g., via the authentication message 208 or the current location information 318 received from the server 206) that the aircraft 202 is moving/flying over the area 316 or is stationary within the area 316. The communication of the IE 209 may be updated (e.g., indicating use of the previously restricted wireless channel may resume) as soon as the aircraft 202 is outside the area 316.

FIG. 4 illustrates an example information element, which may be used for regulating usage of one or more 60 GHz channels, in accordance with an example embodiment. Referring to FIG. 4, the information element (IE) 400 may include an element identification (ID) field 402, a length field 404, an element ID extension field 406 and channel indicator fields 408, . . . , 410. The element ID field 402 identifies the information element 400. The length field 404 identifies the length of the IE 400 after the element ID field 402 and including the channel indicator fields 408, . . . , 410. The extension field 406 provides an extension of the element ID field 402.

When included in a management frame (e.g., a probe request, an association request and other action frames) or in an action frame (e.g., in beacons, probe responses and other action frames), channel indicator fields 408, . . . , 410 may identify wireless channels (e.g., channels 1, . . . , N) which may be restricted for use (or allowed for use). In an example, the channel indicator fields 408, 410 may include an indicator of use restriction (or use allowance) for IEEE 802.11ad channels, including channel 1 centered at 58.32 GHz, channel 2 centered at 60.48 GHz, channel 3 centered at 62.64 GHz, channel 4 centered at 64.80 GHz, channel 5 centered at 66.96 GHz, and channel 6 centered at 69.12 GHz. For example, fields 408, . . . , 410 may include six fields (one for each the above listed six channels of the 60 GHz band), with a binary "1" indicating the channel is restricted (or allowed) and a binary "0" indicating the channel is allowed (or restricted). Other fields within the IE 400 may also be used (e.g., to indicate a pre-determined time for restricting or allowing a channel).

Figure 5:
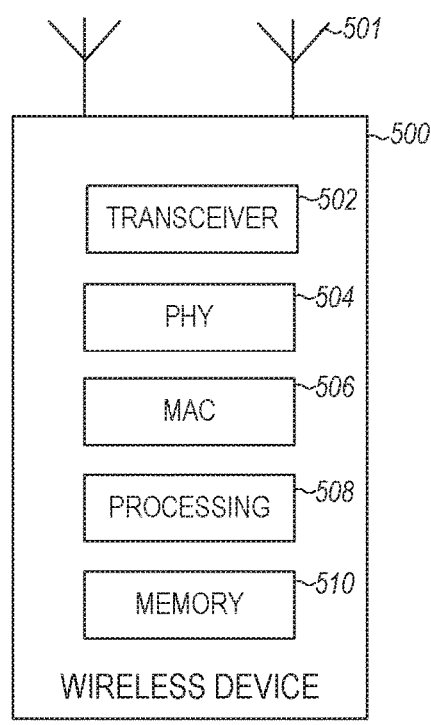
FIG. 5 illustrates a wireless communication device in accordance with some embodiments.

FIG. 5 illustrates a wireless communication device in accordance with some embodiments. Wireless device 500 may be suitable for operating as access point 102 or STA 103 (FIG. 1).

In accordance with embodiments, wireless device 500 may include, among other things, a transmit/receive element 501 (for example, an antenna), a transceiver 502, physical layer (PHY) circuitry 504, and media access control (MAC) circuitry 506. PHY 504 and MAC 506 may be HE compliant layers and may also be compliant with one or more legacy IEEE 802.11 standards (such as 802.11 a/g/n/ac). MAC 506 may be arranged to configure device coexistence class (DCC) elements, and arranged to transmit and receive DCC elements, among other things. Wireless device 500 may also include other hardware circuitry 508 and memory 510, both of which may be configured to perform the various operations described herein. The hardware circuitry 508 may be coupled to the transceiver 502, which may be coupled to the transmit/receive element 501. While FIG. 5 depicts the hardware circuitry 508 and the transceiver 502 as separate components, the hardware circuitry 508 and the transceiver 502 may be integrated together in an electronic package or chip.

In example embodiments, the wireless device 500 is configured to perform one or more of the functions and/or methods described herein in conjunction with FIGS. 1-4, such as enabling controlling/restricting use of one or more wireless channels, such as one or more channels in the 60 GHz band.

The PHY 504 may be arranged to transmit the DCC elements in one or more of a control frame, a management frame or a data frame. The PHY 504 may include circuitry for modulation/demodulation, upconversion/downconversion, filtering, amplification, and so forth. In some embodiments, the hardware circuitry 508 may include one or more processors. The hardware circuitry 508 may be configured to perform functions based on instructions being stored in a random access memory (RAM) or read-only memory (ROM), or based on special purpose circuitry. In some embodiments, the hardware circuitry 508 may be configured to perform one or more of the functions and/or methods described herein in conjunction with FIGS. 1-4, such as enabling controlling/restricting use of one or more wireless channels, such as one or more channels in the 60 GHz band.

In some embodiments, two or more antennas may be coupled to the PHY 504 and arranged for sending and receiving signals including transmission of legacy packets, including legacy (wideband) preamble followed by narrowband preamble and narrowband data. The wireless device 500 may include a transceiver 502 to transmit and receive data such as receiving an information element or an authentication message, or transmitting an information element or an authentication message, for example. The memory 510 may store information for configuring the other circuitry to perform operations for one or more of the functions and/or methods described herein for enabling controlling/restricting use of one or more wireless channels, such as one or more channels in the 60 GHz band.

In some embodiments, the wireless device 500 may be configured to communicate in accordance with one or more specific communication standards, such as the IEEE standards, including IEEE 802.11-2012, 802.11n-2009, 802.11ac-2013, 802.11ad, 802.11ax, standards and/or proposed specifications for WLANs, although the scope of the example embodiments is not limited in this respect as they may also be suitable to transmit and/or receive communications in accordance with other techniques and standards. In some embodiments, the wireless device 500 may use 4× symbol duration of 802.11n or 802.11ac.

In some embodiments, a wireless device 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a base station, a transmit/receive device for a wireless standard such as 802.11 or 802.16, a low-power (LP) device, or other device that may receive and/or transmit information wirelessly using a wideband (e.g., 20 MHz) or narrowband (e.g., 2 MHz) channel bandwidth. In some embodiments, the mobile device may include one or more of a keyboard, a display, a non-volatile memory port, multiple antennas, a graphics processor, an application processor, speakers, and other mobile device elements. The display may be a liquid crystal display (LCD) screen including a touch screen.

The transmit/receive element 501 may comprise one or more directional or omnidirectional antennas, including, for example, dipole antennas, monopole antennas, patch antennas, loop antennas, microstrip antennas or other types of antennas suitable for transmission of radio frequency (RF) signals. In some MIMO embodiments, the antennas may be effectively separated to take advantage of spatial diversity and the different channel characteristics that may result.

Although the device 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 6:
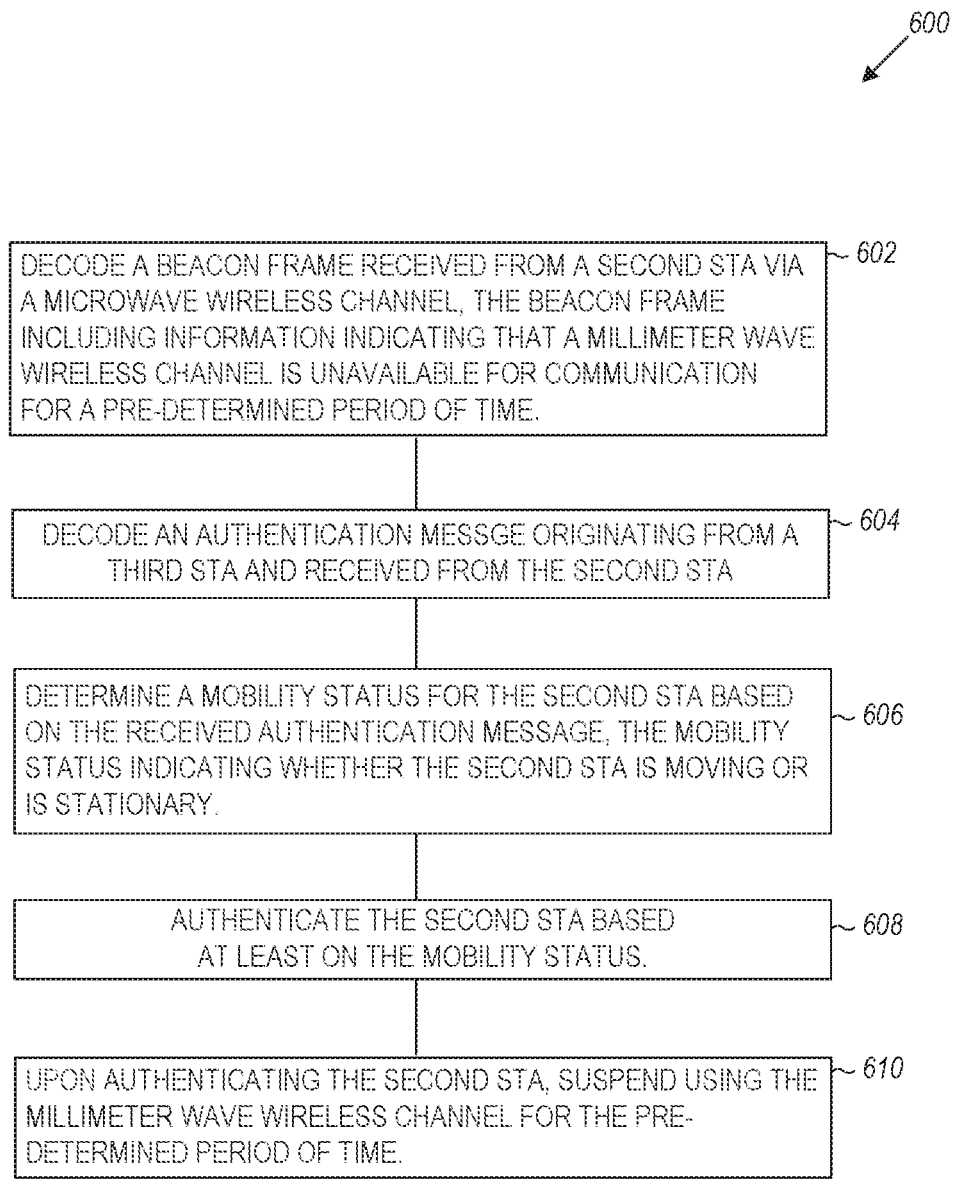
FIG. 6 illustrates a flow diagram of an example method for communication between wireless devices to control usage of the 60 GHz band, in accordance with an example embodiment.

FIG. 6 illustrates a flow diagram of an example method for communication between wireless devices to control usage of the 60 GHz band, in accordance with an example embodiment. Referring to FIG. 6, the example method 600 may start at 602, when a beacon frame is decoded, where the beacon frame is received by a wireless station (STA) (e.g., 103) from a second STA (e.g., 102) via a microwave wireless channel (e.g., a 2.4 GHz or 5 GHz channel). The beacon frame may include information (e.g., information element 209) indicating that a millimeter wave wireless channel (e.g., one or more 60 GHz band channels) is unavailable for communication for a pre-determined period of time. At 604, an authentication message (e.g., 208) originating from a third STA (e.g., server 206) may be decoded, where the authentication message is received by the STA from the second STA. At 606, a mobility status for the second STA may be determined based on the received authentication message (e.g., 208). The mobility status may indicate whether the second STA (e.g., 102) is moving or is stationary. At 608, the second STA may be authenticated based at least on the mobility status. For example, the STA 103 may use the authentication message 208 to confirm that the STA 102 is configured to operate within the aircraft 202 and/or the STA 102 (or the aircraft 202) is within a pre-determined threshold distance from a restricted area (e.g., 306, 316, 312) associated with usage restrictions on one or more wireless channels. At 610, upon authenticating the second STA, the STA 103 may suspend using the millimeter wave wireless channel (e.g., the one or more channels identified by the IE 209) for the pre-determined period of time (e.g., until a next IE is received by the STA 103).

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a master station (or access point) 102, a wireless station 103, personal computer (PC), server (e.g., 206), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display device 710, an input device 712 (e.g., a keyboard), and a user interface (UI) navigation device 714 (e.g., a mouse). In an example, the display device 710, input device 712 and UI navigation device 714 may be a touch screen display. The machine 700 may additionally include a mass storage (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 702 and/or instructions 724 may comprise processing circuitry and/or transceiver circuitry.

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

An apparatus of the machine 700 may be one or more of a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720 utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 720 may include one or more physical jacks (e.g., Ethernet, coaxial, or phone jacks) or one or more antennas to connect to the communications network 726. In an example, the network interface device 720 may include one or more antennas 760 to wirelessly communicate using at least one of single-input multiple-output (SIM), multiple-input multiple-output (MIMO), or multiple-input single-output (MISO) techniques. In some examples, the network interface device 720 may wirelessly communicate using Multiple User MIMO techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES AND EXAMPLES

Example 1 is an apparatus of a wireless station (STA), the apparatus comprising: memory; and processing circuitry, the processing circuitry configured to: decode a packet received from a second STA via a microwave wireless channel, the packet comprising information indicating that a millimeter wave wireless channel is unavailable for communication; determine a current geographic location and a mobility status for the second STA based on an authentication message originating from a third STA, the mobility status indicating whether the second STA is moving or is stationary; authenticate the second STA based at least on the mobility status; and upon authenticating the second STA, suspend using the millimeter wave wireless channel for a pre-determined period of time.

In Example 2, the subject matter of Example 1 optionally includes wherein the mobility status indicates that the second STA is moving, and the current geographic location is associated with one or more restriction rules for the millimeter wave wireless channel.

In Example 3, the subject matter of Example 2 optionally includes wherein the processing circuitry is further configured to: determine the current geographic location is no longer associated with the one or more restriction rules; upon determining the current geographic location is no longer associated with the one or more restriction rules, resume communication using the millimeter wave wireless channel.

In Example 4, the subject matter of any one or more of Examples 1-3 optionally include wherein the authentication message is relayed to the STA by the second STA.

In Example 5, the subject matter of any one or more of Examples 1-4 optionally include wherein the mobility status indicates that the second STA is configured to operate within a flying aircraft.

In Example 6, the subject matter of any one or more of Examples 1-5 optionally include wherein to authenticate the second STA, the processing circuitry is further configured to: receive information comprising the geographic location and the mobility status for the second STA; and authenticate the second STA based on the received information indicating that the second STA is operating within a flying aircraft.

In Example 7, the subject matter of any one or more of Examples 1-6 optionally include wherein the information indicating that the millimeter wave wireless channel is unavailable is included in an information element (IE), the IE comprising: an element identification (ID) field indicating an ID for the IE; a length field indicating a total length of the IE; an element ID extension field indicating an extension of the element ID field; and one or more channel numbers identifying at least one millimeter wave wireless channel to suspended communication on for the pre-determined period of time.

In Example 8, the subject matter of Example 7 optionally includes wherein the IE further identifies the pre-determined period of time.

In Example 9, the subject matter of any one or more of Examples 7-8 optionally include GHz channel.

In Example 10, the subject matter of Example 9 optionally includes ay channel is one of: channel 1 centered at 58.32 GHz; channel 2 centered at 60.48 GHz; channel 3 centered at 62.64 GHz; channel 4 centered at 64.80 GHz; channel 5 centered at 66.96 GHz; and channel 6 centered at 69.12 GHz.

In Example 11, the subject matter of any one or more of Examples 1-10 optionally include wherein the received packet is a beacon frame.

In Example 12, the subject matter of any one or more of Examples 1-11 optionally include transceiver circuitry coupled to the processing circuitry, wherein the transceiver is configured to operate in a millimeter wave range; and one or more antennas coupled to the transceiver circuitry.

In Example 13, the subject matter of any one or more of Examples 1-12 optionally include wherein the STA is arranged to operate in accordance with a wireless local area network (WLAN) protocol.

Example 14 is an apparatus of a wireless station (STA), the apparatus comprising: memory; and processing circuitry, the processing circuitry configured to: decode a beacon frame received from a second STA via a microwave wireless channel, the beacon frame comprising an information element indicating that a millimeter wave wireless channel is unavailable for communication; determine using an authentication message received via the microwave wireless channel, proximity of the second STA to a signal-gathering site location; and suspend using the millimeter wave wireless channel for a pre-determined period of time, when the proximity of the second STA to the at least one signal-gathering site location is below a threshold distance.

In Example 15, the subject matter of Example 14 optionally includes wherein the signal-gathering site location is one of a Radio Astronomy Service (RAS) radar station or site within coverage of an Earth Exploration Satellite Service (EESS) radar station.

In Example 16, the subject matter of any one or more of Examples 14-15 optionally include wherein the processing circuitry is further configured to: decode the authentication message received via the microwave wireless channel from the second STA, wherein the authentication message further includes the threshold distance.

In Example 17, the subject matter of Example 16 optionally includes wherein the second STA is an access point, and wherein the authentication message originates from a third STA associated with the access point.

In Example 18, the subject matter of any one or more of Examples 14-17 optionally include wherein the authentication message further indicates that the radar site location is associated with one or more restriction rules for the millimeter wave wireless channel.

In Example 19, the subject matter of any one or more of Examples 14-18 optionally include GHz channel.

In Example 20, the subject matter of Example 19 optionally includes ay channel is one of: channel 1 centered at 58.32 GHz; channel 2 centered at 60.48 GHz; channel 3 centered at 62.64 GHz; channel 4 centered at 64.80 GHz; channel 5 centered at 66.96 GHz; and channel 6 centered at 69.12 GHz.

In Example 21, the subject matter of any one or more of Examples 19-20 optionally include is unavailable for use during the pre-determined period of time.

Example 22 is a non-transitory computer-readable storage medium that stores instructions for execution by one or more processors to perform operations for communication by a wireless station (STA), the operations to configure the one or more processors to: decode a beacon frame received from a second STA via a microwave wireless channel, the beacon frame comprising information indicating that a millimeter wave wireless channel is unavailable for communication for a pre-determined period of time; decode an authentication message originating from a third STA and received from the second STA; determine a mobility status for the second STA based on the received authentication message, the mobility status indicating whether the second STA is moving or is stationary; authenticate the second STA based at least on the mobility status; and upon authenticating the second STA, suspend using the millimeter wave wireless channel for the pre-determined period of time.

In Example 23, the subject matter of Example 22 optionally includes wherein the authentication message further indicates a current geographic location of the second STA.

In Example 24, the subject matter of Example 23 optionally includes wherein the mobility status indicates that the second STA is moving, and the current geographic location is associated with one or more restriction rules for the millimeter wave wireless channel.

In Example 25, the subject matter of Example 24 optionally includes wherein the operations further configure the one or more processors to: determine the current geographic location is no longer associated with the one or more restriction rules; upon determining the current geographic location is no longer associated with the one or more restriction rules, resume communication using the millimeter wave wireless channel.

Example 26 is an apparatus of a wireless station (STA), the apparatus comprising: means for decoding a packet received from a second STA via a microwave wireless channel, the packet comprising information indicating that a millimeter wave wireless channel is unavailable for communication; means for determining a current geographic location and a mobility status for the second STA based on an authentication message originating from a third STA, the mobility status indicating whether the second STA is moving or is stationary; means for authenticating the second STA based at least on the mobility status; and means for suspending using the millimeter wave wireless channel for a pre-determined period of time, upon authenticating the second STA.

In Example 27, the subject matter of Example 26 optionally includes wherein the mobility status indicates that the second STA is moving, and the current geographic location is associated with one or more restriction rules for the millimeter wave wireless channel.

In Example 28, the subject matter of Example 27 optionally includes means for determining the current geographic location is no longer associated with the one or more restriction rules; means for resuming communication using the millimeter wave wireless channel, upon determining the current geographic location is no longer associated with the one or more restriction rules.

In Example 29, the subject matter of any one or more of Examples 26-28 optionally include wherein the authentication message is relayed to the STA by the second STA.

In Example 30, the subject matter of any one or more of Examples 26-29 optionally include wherein the mobility status indicates that the second STA is configured to operate within a flying aircraft.

In Example 31, the subject matter of any one or more of Examples 26-30 optionally include means for receiving information comprising the geographic location and the mobility status for the second STA; and means for authenticating the second STA based on the received information indicating that the second STA is operating within a flying aircraft.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless station (STA), the apparatus comprising memory; and processing circuitry, the processing circuitry configured to:
    decode a packet received from a second STA via a microwave wireless channel, the packet comprising information indicating that a millimeter wave wireless channel is unavailable for communication;
    determine a current geographic location and a mobility status for the second STA based on an authentication message originating from a third STA, the mobility status indicating whether the second STA is moving or is stationary;
    authenticate the second STA based at least on the mobility status; and
    upon authenticating the second STA, suspend using the millimeter wave wireless channel for a pre-determined period of time.

2. The apparatus of claim 1, wherein the mobility status indicates that the second STA is moving and the current geographic location is associated with one or more restriction rules for the millimeter wave wireless channel.

3. The apparatus of claim 2, wherein the processing circuitry is further configured to:
    determine the current geographic location is no longer associated with the one or more restriction rules; and
    upon determining the current geographic location is no longer associated with the one or more restriction rules, resume communication using the millimeter wave wireless channel.

4. The apparatus of claim 1, wherein the authentication message is relayed to the STA by the second STA.

5. The apparatus of claim 1, wherein the mobility status indicates that the second STA is configured to operate within a flying aircraft.

6. The apparatus of claim 1, wherein to authenticate the second STA, the processing circuitry is further configured to:
    receive information comprising the current geographic location and the mobility status for the second STA; and
    authenticate the second STA based on the received information indicating that the second STA is operating within a flying aircraft.

7. The apparatus of claim 1, wherein the information indicating that the millimeter wave wireless channel is unavailable is included in an information element (IE), the IE comprising:
    an element identification (ID) field indicating an ID for the IE;
    a length field indicating a total length of the IE;
    an element ID extension field indicating an extension of the element ID field; and
    one or more channel numbers identifying at least one millimeter wave wireless channel to suspend communication on for the pre-determined period of time.

8. The apparatus of claim 7, wherein the IE further identifies the pre-determined period of time.

9. The apparatus of claim 7, wherein the millimeter wave wireless channel is an IEEE 802.11ad or an IEEE 802.11ay channel, and the microwave wireless channel is one of a 2.4 GHz channel or a 5 GHz channel.

10. The apparatus of claim 9, wherein the IEEE 802.11ad or the IEEE 802.11ay channel is one of:

channel 1 centered at 58.32 GHz;
channel 2 centered at 60.48 GHz;
channel 3 centered at 62.64 GHz;
channel 4 centered at 64.80 GHz;
channel 5 centered at 66.96 GHz; and
channel 6 centered at 69.12 GHz.

11. The apparatus of claim 1, wherein the received packet is a beacon frame.

12. The wireless station of claim 1, further comprising:
transceiver circuitry coupled to the processing circuitry, wherein the transceiver is configured to operate in a millimeter wave range; and
one or more antennas coupled to the transceiver circuitry.

13. The apparatus according to claim 1, wherein the STA is arranged to operate in accordance with a wireless local area network (WLAN) protocol.

14. A non-transitory computer-readable storage medium that stores instructions for execution by one or more processors to perform operations for communication by a wireless station (STA), the operations to configure the one or more processors to:
decode a beacon frame received from a second STA via a microwave wireless channel, the beacon frame comprising information indicating that a millimeter wave wireless channel is unavailable for communication for a pre-determined period of time;
decode an authentication message originating from a third STA and received from the second STA;
determine a mobility status for the second STA based on the received authentication message, the mobility status indicating whether the second STA is moving or is stationary;
authenticate the second STA based at least on the mobility status; and
upon authenticating the second STA, suspend using the millimeter wave wireless channel for the pre-determined period of time.

15. The non-transitory computer-readable storage medium according to claim 14, wherein the authentication message further indicates a current geographic location of the second STA.

16. The non-transitory computer-readable storage medium according to claim 15, wherein the mobility status indicates that the second STA is moving and the current geographic location is associated with one or more restriction rules for the millimeter wave wireless channel.

17. The non-transitory computer-readable storage medium according to claim 16,
wherein the operations further configure the one or more processors to:
determine the current geographic location is no longer associated with the one or more restriction rules;
upon determining the current geographic location is no longer associated with the one or more restriction rules, resume communication using the millimeter wave wireless channel.

* * * * *

UNITED STATES PATENT AND TRADEMARK OFFICE
CERTIFICATE OF CORRECTION

PATENT NO. : 10,129,758 B2
APPLICATION NO. : 15/373404
DATED : November 13, 2018
INVENTOR(S) : Cordeiro et al.

It is certified that error appears in the above-identified patent and that said Letters Patent is hereby corrected as shown below:

In the Claims

In Column 16, Line 6, in Claim 1, delete "comprising" and insert --comprising:-- therefor In Column 16, Line 23, in Claim 2, delete "moving" and insert --moving,-- therefor Signed and Sealed this
Twenty-first Day of April, 2020

Andrei Iancu
*Director of the United States Patent and Trademark Office*